(12) United States Patent
Folk

(10) Patent No.: US 9,852,657 B2
(45) Date of Patent: Dec. 26, 2017

(54) SOLAR EDUCATIONAL MONUMENT

(71) Applicant: Charles Folk, Rising Sun, IN (US)

(72) Inventor: Charles Folk, Rising Sun, IN (US)

( * ) Notice: Subject to any disclaimer, the term of this patent is extended or adjusted under 35 U.S.C. 154(b) by 826 days.

(21) Appl. No.: 14/069,876

(22) Filed: Nov. 1, 2013

(65) Prior Publication Data

US 2015/0125841 A1 May 7, 2015

(51) Int. Cl.
| | |
|---|---|
| *G09B 23/00* | (2006.01) |
| *G09B 27/00* | (2006.01) |
| G09B 27/02 | (2006.01) |
| G04B 49/02 | (2006.01) |
| G09B 27/04 | (2006.01) |
| G04B 49/04 | (2006.01) |
| F24J 2/12 | (2006.01) |
| F24J 2/06 | (2006.01) |

(52) U.S. Cl.
CPC ............. *G09B 23/00* (2013.01); *G09B 27/00* (2013.01); *F24J 2/067* (2013.01); *F24J 2/12* (2013.01); *G04B 49/02* (2013.01); *G04B 49/04* (2013.01); *G09B 27/02* (2013.01); *G09B 27/04* (2013.01)

(58) Field of Classification Search
CPC ... F24J 2/12; F24J 2/067; G04B 49/02; G04B 49/04; G09B 27/00; G09B 27/02; G09B 23/00; G09B 27/04
USPC .............. 33/270; 968/415; 368/15; 434/284, 434/285, 106
See application file for complete search history.

(56) References Cited

U.S. PATENT DOCUMENTS

| | | | | |
|---|---|---|---|---|
| 3,107,441 | A | * 10/1963 | Scott | ...................... G09B 27/02 434/291 |
| 4,194,306 | A | 3/1980 | Rogers | |
| 4,219,944 | A | 9/1980 | Keenan | |
| 4,384,408 | A | * 5/1983 | Bohlayer | ............... G04B 49/04 33/270 |
| 5,579,163 | A | 11/1996 | Peterson | |
| 5,931,678 | A | 8/1999 | Atzaba | |
| 7,004,588 | B2 | 2/2006 | Sadler | |
| 7,308,769 | B2 | 12/2007 | Labedz | |
| 8,066,378 | B2 | 11/2011 | Lalley et al. | |

(Continued)

OTHER PUBLICATIONS

Neda Yaghoobian, Jan Kleissl, "Effect of reflective pavements on building energy use", 2012, "Urban Climate", pp. 25-42.*

(Continued)

*Primary Examiner* — Jack Yip
(74) *Attorney, Agent, or Firm* — C. John Brannon; Brannon Sowers & Cracraft PC

(57) ABSTRACT

An educational monument, comprising a designated geographical area accessible to a general public, a first structure having a first face positioned to receive a solar light beam, an aperture formed through the first structure for projecting the light beam at predetermined times and, a second structure positioned to receive the light beam at a first predetermined time. A third structure positioned to receive the light beam at a second predetermined time. Wherein a transition of the light beam reflects a change in the seasons and an alignment of Earth illustrating a physical representation of the transition at a plurality of successive predetermined times, each respective predetermined time being the same hour on a different day. Wherein a plurality of ellipses are scaled from the receiving wall, accurately representing the scaled orbit of the planets.

15 Claims, 7 Drawing Sheets

(56) References Cited

U.S. PATENT DOCUMENTS 8,205,346 B1  6/2012  Cheng
8,210,686 B2  7/2012  DePaor

OTHER PUBLICATIONS

National Park Service, "Map of National Mall", Jan. 14, 2012, https://www.nps.gov/PWR/state/DC/upload/NPS-Map-Washington-DC.pdf, retrieved from Internet Wayback Machine, pp. 1-2.*

* cited by examiner

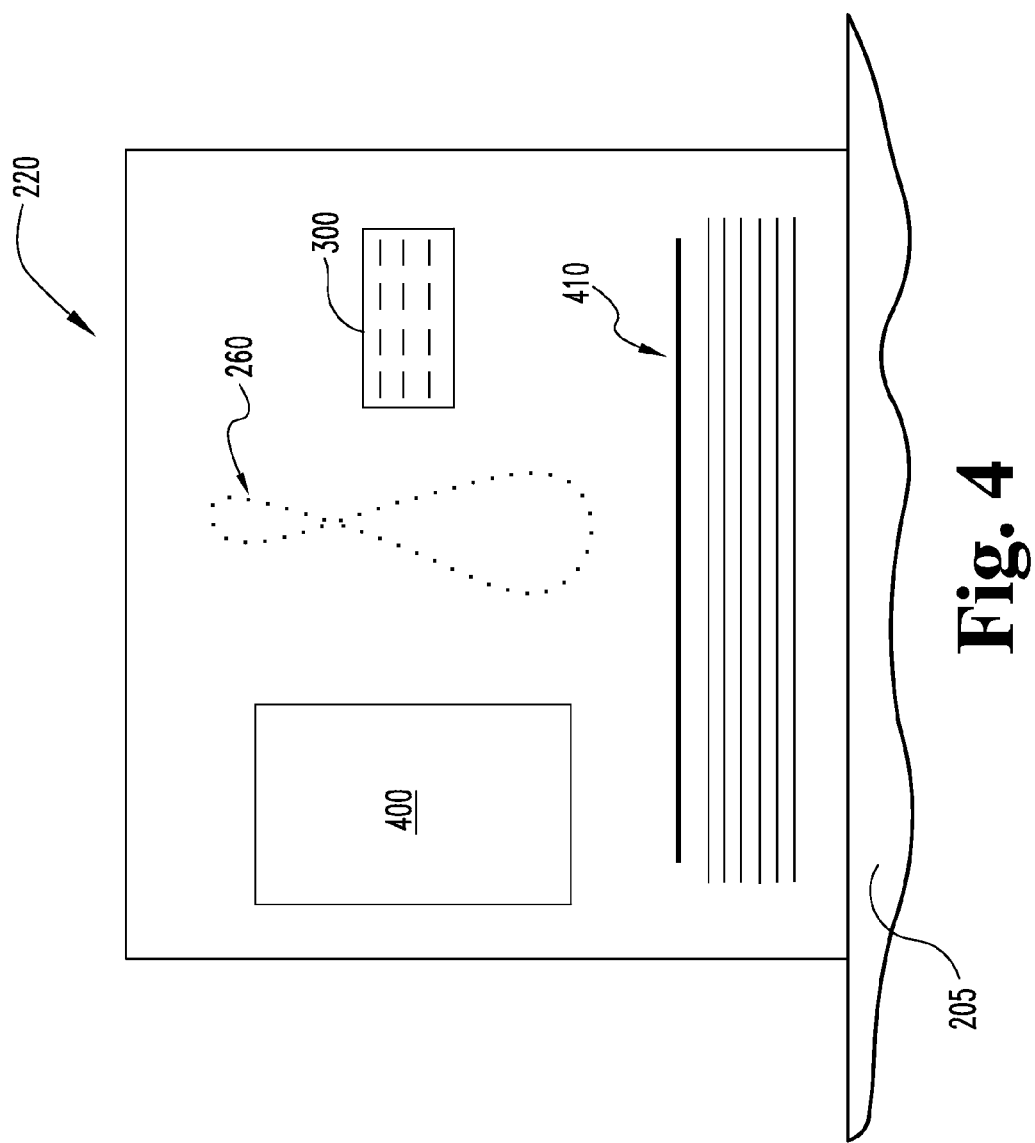

SOLAR EDUCATIONAL MONUMENT

FIELD

The claimed technology relates generally to astronomy, and more particularly, to an outdoor monument that directs sunlight onto a designated locations corresponding to calendar events.

BACKGROUND

Monuments have long been a fundamental part of human society, both in the large scale as well as the small. In today's society, monuments may be created to represent an event relevant to a geological region, or to commemorate the life or achievements of a person or group. In ancient society, monuments were also constructed to track astronomical movements, including tracking the stars and solar patterns. Evidence of this can be seen, for example, in various stone placements throughout England (such as Stonehenge, Kintraw, and the Cultoon stone circle in Islay). The placement of each sites' stone structures lines up with a solar phase as the rotation of the Earth and the seasons change. Monuments of this nature are large and only convey a small amount of astronomical information.

Structures that illustrate the alignment of the sun exist in the old world and the new, as evidenced by the sun's alignment with city planning of New York City. The Commissioners' Plan of 1811 laid out a city grid that aligned the city streets in such a way that twice during the year the sun will rise and set in alignment with east-west streets. This phenomenon is not limited to New York City, but can be found in cities throughout the world when a uniform street grid has been incorporated into the city planning. While natural demonstrations of this nature are fascinating to the public, they are also limited in their educational scope.

Planetariums offer educational representations of the solar system and the sun, but a planetarium is an enclosed environment. A planetarium is limited by the space encapsulated by the dome of the building and the quality of the projection system. This educational experience is unable to fully realize the vast scale of the solar system. The projector system's ultimate objective is to provide an accurate relative understanding of motion witnessed in the sky at night. There are limitations as the planetariums range in size from small inflatable domes to 20-meter plus permanent structures with fixed seating. Visitors may gain the benefit of seeing the entire solar system and the night sky but true scale of the universe can be lost by the visitor because of the size of the building.

Thus, there are shortcomings in both a monument of grand scale, offering only limited information and planetariums with limited personal scale. In addition, there is a need to have a truly representative scale in an educational monument, one that expresses more than just a visual representation but also a spatial one. The disclosed technology addresses this need.

BRIEF DESCRIPTION OF THE DRAWINGS

FIG. 4 is a frontal view of a second structure detailing an analemma according to one embodiment of the disclosed technology.

DESCRIPTION

Figure 1:
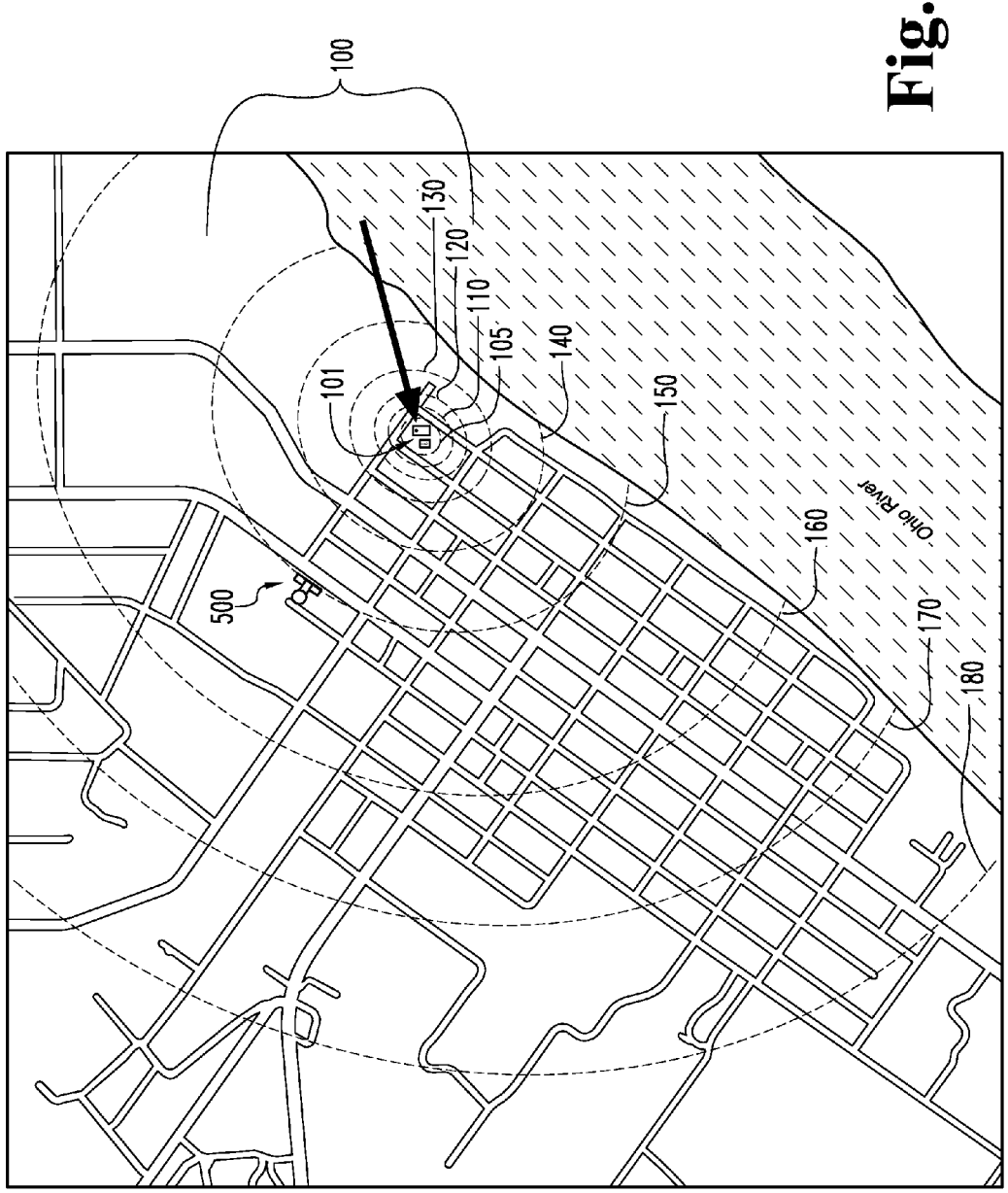
FIG. 1 is an illustrative map, showing the placement of the one embodiment of the disclosed technology in a cityscape.

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would normally occur to one skilled in the art to which the claimed technology relates.

FIGS. 1 through 5 illustrates a first embodiment of the educational monument system 100 present in the novel technology. This particular embodiment relates to the solar system, but embodiments may be constructed to represent other phenomena. FIG. 1 shows a central location 101 where an educational monument 200 is positioned, so that additional planetary representational structures 500 may be accurately positioned from that point moving outward in generally elliptical patterns scaled to represent planetary orbits 105, 110, 120, 130, 140, 150, 160, 170, and 180. The central location 101 typically hosts a plurality of structures 210, 220 to define an educational monument 200 for visitors to explore. The central location 101 represents the center of our solar system, with the Sun or Sol as a prominent feature. Sol's accurate shape and scaled size may be incorporated into the structures 210, 220 located at the central location 101 but that may not be done in other embodiments.

From the central location 101, additional structures 500 and orbital patterns 105, 110, 120, 130, 140, 150, 160, 170, and 180 are positioned to define a scaled representation of the distances between the planetary or astronomical bodies depicted by the monument system 100. A set scale of representation is typically established at the central location 101 that is generally uniform through the educational monument 200. This allows for accurate placement of the other structures such as planetary representations 500, so that a predetermined and uniform scale is achieved both in the distances between each structure 500 and the size of the astronomical body represented in that informational display 540. The planetary representations 500 of this embodiment include Mercury, Venus, Earth, Mars, Jupiter, Saturn, Uranus, and Neptune. Other embodiments may further include Pluto as the ninth planetary representation 500.

Each of the planetary representations 500 may be constructed from a variety of materials that may consist of stone, metal, ceramic, glass, or other like items. The second structure 220 may be constructed of low reflection materials so the light beam 250 will not be reflected. A low reflection material used in this second structure would be measured by the Albedos Scale in the range of 0.09 to 0.18. This low reflection will allow the second structure 220 to better show the position of a light beam 250.

FIG. 1 shows various elliptical paths 105, 110, 120, 130, 140, 150, 160, 170, and 180 around the central location 101, the paths representing the orbits of the planetary representations 500. Each path 105, 110, 120, 130, 140, 150, 160, 170, and 180 is typically visible in some fashion throughout the local city, and/or region, typically providing a representative outline for the visitor to traverse when exploring the entire monument system 100. Typically, there are inherent geographic limitations on the size and placement of the paths 105, 110, 120, 130, 140, 150, 160, 170, and 180, as each orbit will intersect a building, a road, or the like. Crosswalks and other safety measures may be included to facilitate safe movement along each path. The educational monument system 100 typically includes both the planetary orbits 105, 110, 120, 130, 140, 150, 160, 170, and 180 as well as representations of other celestial phenomena 600 of note, such as the asteroid belt, Haley's Comet, the Kuiper belt, comets, various moons, and the like. These individual astro-structures (not shown) are also scaled to the corresponding size of the monument system 100.

Figure 2A:
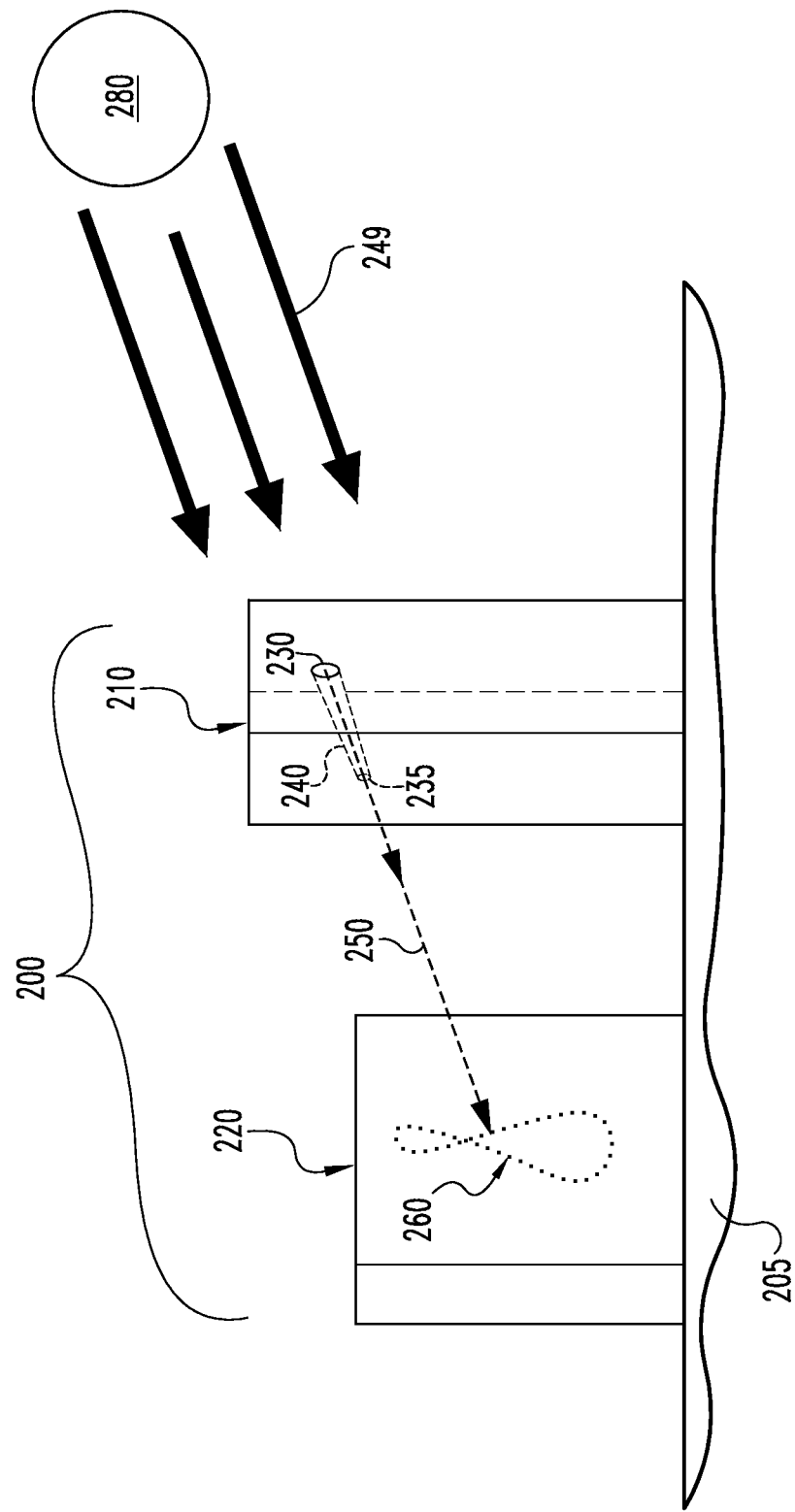
FIG. 2A is a representation of another embodiment of the disclosed technology's central display.
Figure 2B:
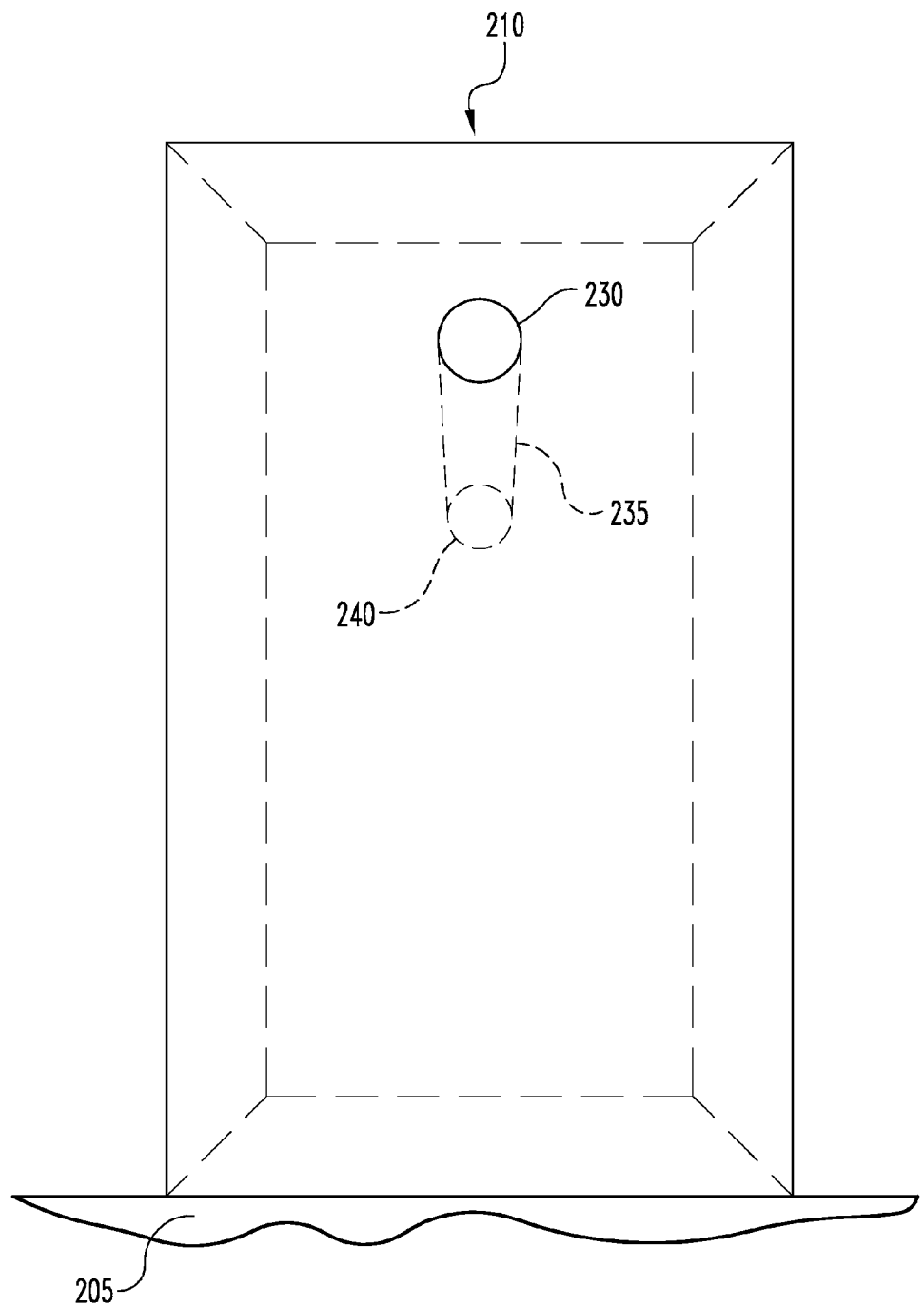
FIG. 2B is a frontal view of a first structure with receiving aperture according to one embodiment of the disclosed technology.
Figure 3:
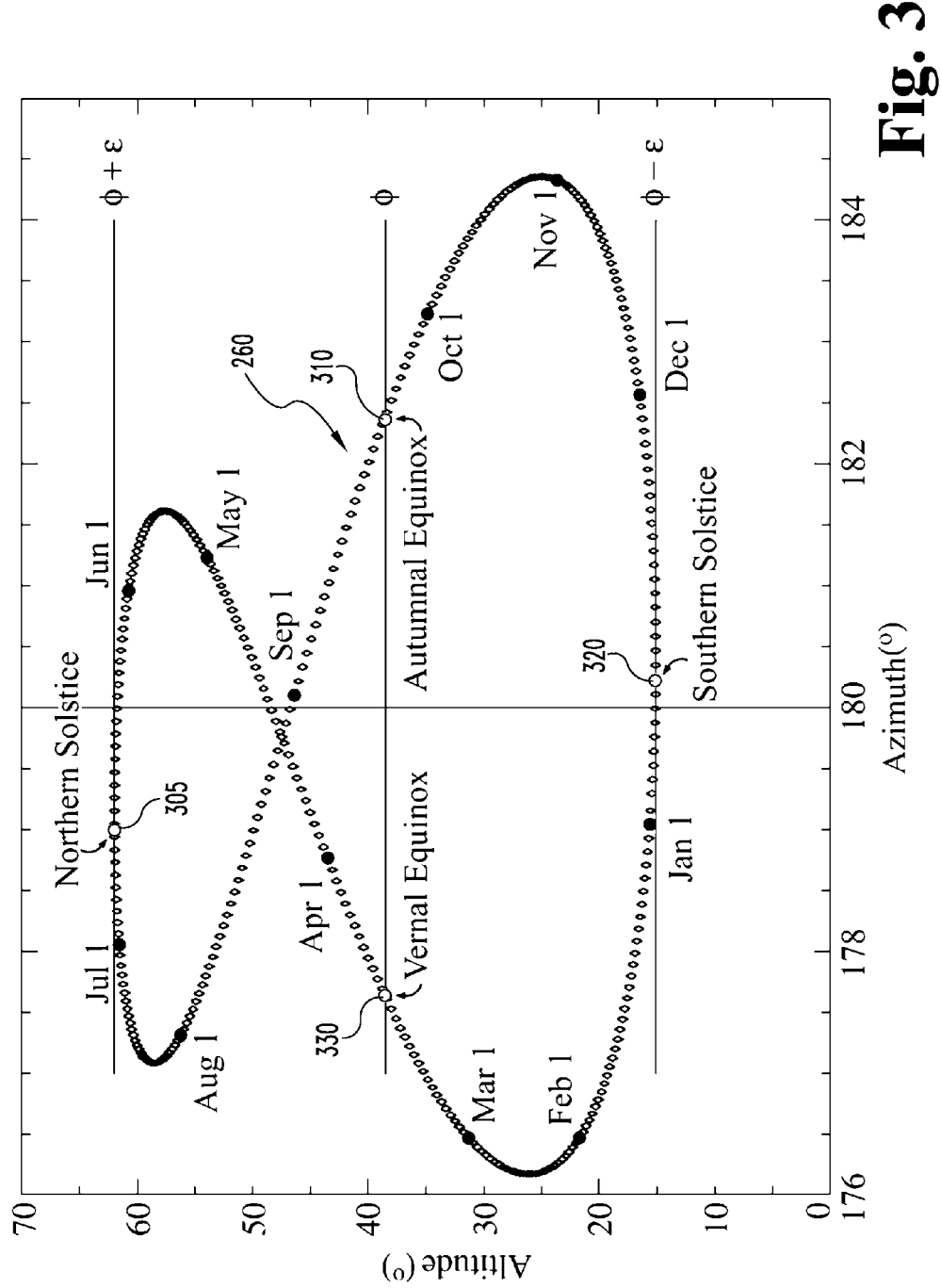
FIG. 3 is a representation of an analemma according to one embodiment of the disclosed technology.

The central location 101 is typically interactive with the phases of the sun 280. One embodiment of the educational monument system 100 may have two centralized structures 210, 220 that redirect light beams 250 from the sun 280 during a specific time each day. The first structure 210 faces the sun 280 and has a focusing medium 235 placed at a specific intake point 230 to direct the light beams 250 onto the second structure's 220 receiving face 290. FIG. 2A shows sun light 249 entering the focusing medium 235 of the first structure 210 of the central monument 200. The light beams 250 are focused through a transparent medium 235 at a predetermined location 240 in the first structure 210 and projected onto the second structure 220. The second structure 220, as shown in FIGS. 3 and 4, includes a receiving wall 290, which is typically oriented parallel to the first structure 210 and typically contains a central display 400 and informational instruction 410. This central display 400 has an analemma 260, which defines a skewed "figure-8" that is created by the axial tilt of the Earth during its rotation around the sun 280. As the seasons change, the light beam 250 reflects the terrestrial alignment of the Earth. As shown in FIG. 4, a calendar 300 or information pertaining to the sun's alignment may be etched or otherwise displayed onto the monument 220 as well so that the analemma 260 displaying the proper date at the time in which the light beam 250 appears on the receiving wall 220. FIG. 2B shows the first structure 210 with the aperture or the focusing component 230. This is used to block direct sunlight 249 from the receiving wall 220 at a specific time and only allow the desired light 250 to shine on the surface 290 of the receiving wall 220.

Figure 5A:
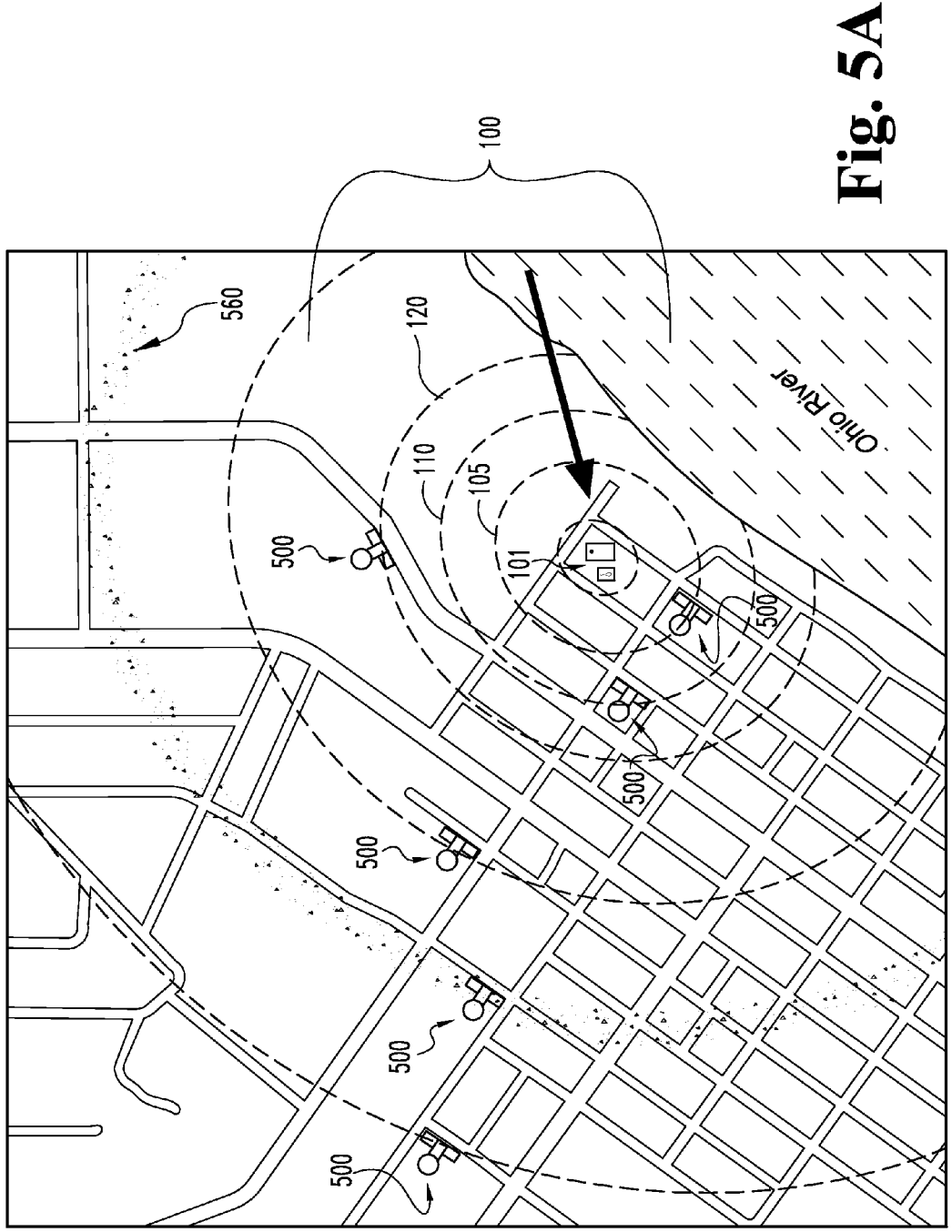
FIG. 5A is a magnified overview of a monument in a cityscape according to one embodiment of the disclosed technology.
Figure 5B:
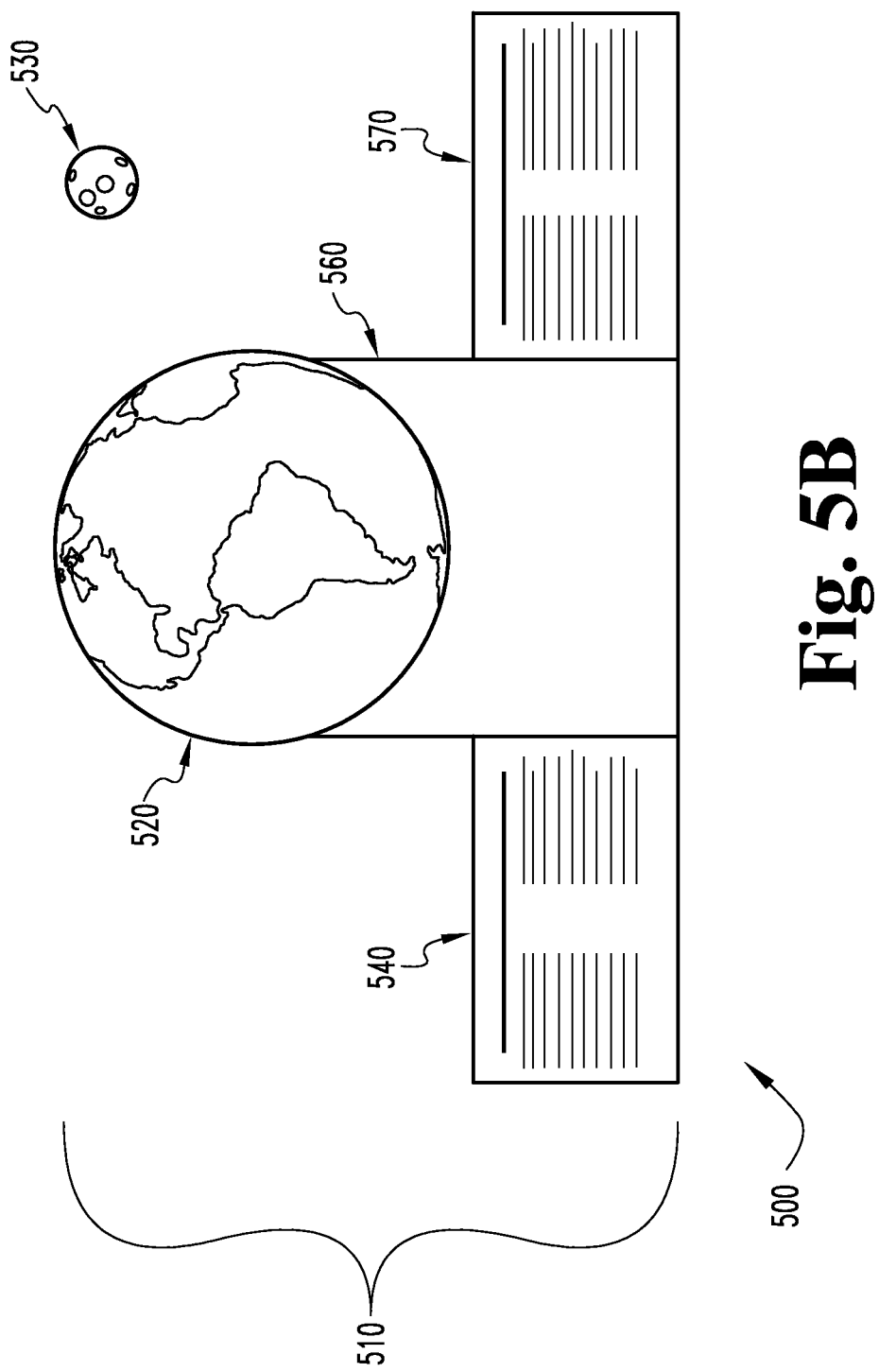
FIG. 5B is a representation of one embodiment of the disclosed technology's planetary display.

FIG. 5A is an enlarged view of the monument system 100 and the correlating planetary orbits 105, 110, and 120 with their respective planet 520, which is scaled to the correlating size. Each planetary representation 500 may have its own display 510, each optionally detailing a series of facts 540, 570 known about the planet 520. Additionally, the display 510 may show scaled representations of localized celestial bodies 530, such as moons or rings. FIG. 5B shows the display 510 for a typical planet 520, having a moon 530. FIG. 5B shows the planet 520 in particular for illustrative purposes, and that the other planets, moons, comets, and the like are similarly represented by the monument system 100. Each planetary monument 500 typically comprises a planet 520, any respective moons 530, planetary information 540, a central support structure for the planet 560, and/or planetary orbital information 570. The display 510 is typically placed on an illuminated path tracing the respective planets orbit 105, 110, 120, 130, 140, 150, 160, 170, and 180, alternatively, may simple be positioned in a more desirable place. In this embodiment, representations of this nature are used to represent each celestial body, and as such require a predetermined amount of space to allow for proper scaling.

The monument structure 100 as a whole is typically used to instruct, through actual spacing, the viewer as to the true scale of the solar system. Pictures, like those taken by Voyager, are inherently limited in how much they can teach. Since humans, as a whole, rarely comprehend the size and distance of objects that are beyond their daily observations, the monument 100 allows visitors, in real time, to better understand the vastness of their solar system. By starting with a central accurate representation of the sun 280 and then properly scaling the remaining solar system, a better physical representation of vast size is created. When visitors personally move through each display 510 in the monument 100, they have a more realized sense of scale. Walking the orbital paths 105, 110, 120, 130, 140, 150, 160, 170, and 180 further illustrates the scaled distance. This representation helps to foster an understanding of the vastness of space as more comprehendible to the visitor in ways that cannot be accomplished through traditional media.

While the claimed technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the claimed technology are desired to be protected.

What is claimed is:

1. An educational monument system, for positioning at a geographical area comprising:
    a central location defining:
        a first structure defining an aperture, through a first face for allowing a solar light beam to traverse the first structure and through a second, opposing face of the first structure, wherein the first structure represents Sol;
        a second spaced structure aligned with the first structure to define forming a receiving wall for the solar light beam and having a tracking pattern formed, thereonto the receiving wall;
    a plurality of planet structures positioned at respective predetermined locations, wherein each respective planet structure represents a respective individual planet;
    a plurality of astro-structures located at respective predetermined locations, wherein each respective astro-structure represents a celestial phenomena;
    wherein the positions of the respective planet structures and the positions of the respective astro-structures are scaled relative the position of the first structure to represent respective planets and respective astro-structures as they naturally occur relative to Sol;
    wherein translation of the solar light beam generates a path on the receiving wall of the second face representing movement of planet Earth around Sol;

wherein daily translation of the solar light beam appears at a different predetermined point along the tracking pattern of the receiving wall at a predetermined time each sequential day;

wherein a plurality of respective ellipses are scaled at a predetermined distance from the central location to represent a respective orbit of a respective planet;

wherein the educational monument system is constructed with a uniform scale; and, wherein a user engages the education monument system by traversing within and around the education monument system.

2. The educational monument system as claimed in claim 1, wherein the second structure includes an informational instruction detailing the solar pattern of Sol through an upcoming year.

3. The educational monument system as claimed in claim 1, wherein the first structure is at least partially transparent.

4. The educational monument system as claimed in claim 3, wherein the first structure only allows the solar light beam to be visible on the second structure at the predetermined time each day.

5. The educational monument system as claimed in claim 4, wherein the aperture of the first structure is positioned to allow the solar light beam through at specific times each day to trace a solar analemma on the second structure.

6. The educational monument system as claimed in claim 1, wherein the orbit of each planet is partially defined by a walking path.

7. The educational monument system as claimed in claimed 6, wherein each partially defined walking path may be adjusted to show the location of the planet in orbit.

8. The educational monument system as claimed in claim 1, wherein the structure representing each individual planet provides a series of information about that planet.

9. The educational monument system as claimed in claim 1, wherein the structures representing each individual celestial phenomena provides a series of information about that celestial phenomena.

10. A method of teaching celestial phenomena scale and information, comprising:
   a) defining a central wall representing Sol with an aperture for projecting a solar light beam onto a second wall structure aligned with the central wall; wherein the central wall is scaled to a predetermined scale;
   b) defining a first elliptical path around the central structure, scaled to a size and an orbit of Mercury;
   c) defining a second structure and a second elliptical path around the central structure scaled to a size and an orbit of Venus;
   d) defining a third elliptical path around the central structure scaled to a size and an orbit of Earth;
   e) defining a fourth elliptical path around the central structure scaled to a size and an orbit of Mars;
   f) defining a fifth elliptical path around the central structure scaled to a size and an orbit of Jupiter;
   g) defining a sixth elliptical path around the central structure scaled to a size and an orbit of Saturn;
   h) defining a seventh elliptical path around the central structure scaled to a size and an orbit of Uranus;
   i) defining an eighth elliptical path around the central structure scaled to a size and an orbit of Neptune;
      wherein the central wall demonstrates a scale comparison of a scaled representation and an actual representation;
      wherein each elliptical orbit teaches the scale comparison as a user traverses the elliptical orbit, wherein the scaled representation is displayed on one side and the actual representation is displayed on the other side of the elliptical orbit;
      wherein the scale of each respective structure corresponds to the scaled representation of the elliptical orbits and the central wall; and,
      wherein the second structure has a reflectivity below 0.18 on an Albedos Scale;
      thereby teaching the corresponding scale as the user traverses a scaled distance between each respective elliptical orbit.

11. The method of teaching as claimed in claim 10, wherein the second walled structure displays an analemma that is traced by the solar light beam through a transition of Sol.

12. The method of teaching as claimed in claim 11, wherein the transition of Sol is demonstrated through the solar light beam's projection onto the analemma at a predetermined time each day.

13. The method of teaching as claimed in claim 10, wherein an additional celestial phenomena can be defined by a scaled structure and a scaled orbit correspondingly positioned to the central wall representing Sol.

14. The method of teaching as claimed in claim 13, wherein the celestial phenomena can comprise:
   j) defining a ninth elliptical path around the central structure scaled to a size and an orbit of an Asteroid belt;
   k) defining a tenth elliptical path around the central structure scaled to a size and an orbit of Pluto;
   l) defining an eleventh elliptical path around the central structure scaled to a size and an orbit of an Asteroid belt;
   m) defining a twelfth elliptical path around the central structure scaled to a size and an orbit of Haley's Comet.

15. The method of teaching as claimed in claim 14, wherein each elliptical orbit demonstrates a current position of the respective planet.

* * * * *